(12) United States Patent
Manning (10) Patent No.: US 12,253,364 B2
(45) Date of Patent: Mar. 18, 2025

(54) SYSTEMS AND METHODS FOR DETERMINING ROUTING DATA USING MULTIPLE DATA STRUCTURES

(71) Applicant: Verizon Patent and Licensing Inc., Basking Ridge, NJ (US)

(72) Inventor: David P. Manning, Christchurch (NZ)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 287 days.

(21) Appl. No.: 18/047,448

(22) Filed: Oct. 18, 2022

(65) Prior Publication Data

US 2024/0125606 A1 Apr. 18, 2024

(51) Int. Cl.
*G06F 16/00* (2019.01)
*G01C 21/34* (2006.01)

(52) U.S. Cl.
CPC ........... *G01C 21/34* (2013.01); *G01C 21/343* (2013.01); *G01C 21/3446* (2013.01)

(58) Field of Classification Search
CPC ................................. G06F 16/13; G06F 16/31
See application file for complete search history.

(56) References Cited

U.S. PATENT DOCUMENTS

| | | | | |
|---|---|---|---|---|
| 11,170,030 | B2* | 11/2021 | Gavriil | G06F 16/29 |
| 11,610,229 | B2* | 3/2023 | Flack | G06F 16/22 |
| 11,853,909 | B1* | 12/2023 | O'Neil | G01C 21/3697 |
| 2013/0066548 | A1* | 3/2013 | Gruen | G01C 21/3617 |
| | | | | 701/410 |
| 2017/0269601 | A1* | 9/2017 | Jones | B60W 50/06 |
| 2021/0172740 | A1* | 6/2021 | Cajias | G08G 5/045 |
| 2023/0080281 | A1* | 3/2023 | Kundu | G06N 5/022 |
| | | | | 701/410 |
| 2023/0204372 | A1* | 6/2023 | Xu | G08G 1/0112 |
| 2024/0230358 | A1* | 7/2024 | Sharifi | G01C 21/3694 |
| 2024/0328812 | A1* | 10/2024 | Lota | G01C 21/3647 |
| 2024/0385626 | A1* | 11/2024 | Obara | B62D 6/002 |

* cited by examiner

*Primary Examiner* — Noosha Arjomandi (57) ABSTRACT

A vehicle routing platform may store, in a first data structure, a value at a logical index for each pair of locations of a plurality of pairs of locations. The logical index, for a pair of locations, indicates whether a travel time has been determined. The vehicle routing platform may store, in a second data structure, an offset index for each predetermined logical index of one or more predetermined logical indexes of the first data structure. The offset index, for a predetermined logical index, may be based on a quantity of logical indexes preceding the predetermined logical index in the first data structure. The vehicle routing platform may store, in a third data structure, travel times between pairs of locations of a portion of the plurality of pairs of locations. The vehicle routing platform may determine a travel time, between a pair of locations, using the data structures.

20 Claims, 9 Drawing Sheets

SYSTEMS AND METHODS FOR DETERMINING ROUTING DATA USING MULTIPLE DATA STRUCTURES

BACKGROUND

A vehicle routing problem has a goal to find an optimal route or set of routes for a vehicle or set of vehicles to traverse in order to deliver various items to a set of customers. For example, a solution to a typical vehicle routing problem identifies a set of vehicle trips from a given location (e.g., a depot) to a set of customers such that each trip starts from and ends at the given location, each customer is visited exactly once, and a total demand handled by each vehicle does not exceed applicable limitations on vehicle capacity.

DETAILED DESCRIPTION OF PREFERRED EMBODIMENTS

The following detailed description of example implementations refers to the accompanying drawings. The same reference numbers in different drawings may identify the same or similar elements.

A vehicle routing problem involves evaluating numerous permutations of locations and determining shortest travel times and/or shortest distances between the locations. Information regarding the locations and regarding the travel times (between the locations) may be stored in a data structure. In some instances, numerous potential paths (between the locations) may be available. However, only a portion of the potential paths may be considered. Therefore, only information regarding the portion of the potential paths is to be stored in the data structure. Accordingly, the data structure should be capable of supporting sparse data (e.g., storing data of a matrix with sparse data).

In some situations, the data structure may be a row major array. The row major array may store travel times for each pair of locations associated with the potential paths. In this regard, the row major array may reduce random access latency. However, the row major array requires memory to be allocated for each pair of locations associated with all the potential paths, including paths that are not considered. Accordingly, the row major array does not support data sparsity.

Alternatively to the row major array, the data structure may be a sparse array (e.g., a compressed sparse row (CSR) format). The sparse array supports data sparsity. However, the sparse array requires memory to be allocated for each value (distance each between each pair of locations), a column index (for a destination location of the pair of locations), and an offset for each row (for an origin location of the pair of locations). One limitation of the sparse array is that an access time (for accessing values in the sparse array) is not constant. In this regard, the access time may negatively a timeliness with respect to determining shortest travel times and/or shortest distances between the locations. Additionally, a memory use by the sparse array exceeds a memory use of the row major array if a portion of all the potential paths considered satisfies a threshold (e.g., if the portion exceeds 80% of all the potential paths considered).

Alternatively to the sparse array, the data structure may be a hash table. The hash table utilizes a key and a hash function to map the key to an array index. The key is stored in the array along with a value (referenced by the key) or with a pointer to the value. The hash table may provide constant random access time. However, because the hash table stores keys and values referenced by the keys, a memory use by the hash table exceeds a memory use of the row major array and/or of the sparse array if a portion of all the potential paths considered satisfies a threshold (e.g., if the portion exceeds 50% of all the potential paths considered). Therefore, current data structures do not have consistent balance of memory requirements and access speed over a wide range of considered portions of all the potential paths.

Implementations described herein are directed to using multiple data structures (e.g., a combination of data structures) to store information regarding a plurality of locations and/or regarding travel times between pairs of locations of the plurality of locations. For example, a first data structure may store a value at a logical index for each pair of locations of a plurality of locations. A pair of locations may include an origin location and a destination location. A logical index (for the pair of locations) may correspond to a position of data in a row major array. The value, at the logical index, may indicate whether a travel time, between the pair of locations, has been determined and/or is to be stored. For the example, the value at the logical index may be a first value when the travel time has not been stored. Alternatively, the value at the logical index may be a second value when the travel time has been stored.

A second data structure may store an offset index for every Nth logical index. Storing an offset index for every Nth logical index enables an access time to be constant (in contrast to the access time for sparse arrays). An offset index may be an offset associated with a third data structure that stores travel times between pairs of locations of a portion of the plurality of pairs of locations. As an example, the second data structure may store an offset index for every $128^{th}$ logical index. In some instances, the access time may be directly related to the value of N. In some examples, the value of N may be determined to balance memory requirements with access times. Additionally, the value of N may be independent with respect to the number of locations. In some examples, the offset index, for an Nth logical index, may indicate a quantity of preceding logical indexes with values indicating that travel times have been stored. The preceding logical indexes may precede the Nth logical index in the first data structure.

In some implementations, a vehicle routing platform may store values at the logical indexes in the first data structure (to indicate whether travel times for the logical indexes have been stored), store the offset indexes in the second data structure, and store the travel times in the third data structures. The vehicle routing platform may determine a particular travel time between a particular pair of locations using a combination of the data structures discussed above.

For example, the vehicle routing platform may determine whether a particular value at a particular logical index, for the particular pair of locations, indicates that the particular travel time has been stored. The vehicle routing platform may determine a particular offset index associated with the particular logical index (for the particular pair of locations) based on determining that the particular travel time has been stored.

The vehicle routing platform may identify, in the third structure, the particular travel time based on a number of preceding logical indexes for which travel times have been stored. For example, the preceding logical indexes may precede the particular logical index in the first data structure. The particular offset index may indicate the number of preceding logical indexes. In this regard, the number of preceding logical indexes may be determined based on the particular value at the particular logical index and the particular offset index. Using the combination of data structures as described herein may support constant random access while minimizing an amount of memory allocation for storing the information regarding the plurality of locations and/or regarding the travel times.

FIGS. 1A-1F are diagrams of an example implementation 100 associated with determining routing data using multiple data structures. As shown in FIGS. 1A-1F, example implementation 100 includes a vehicle routing platform 105, a first client device 110, a first data structure 115, a second data structure 120, a third data structure 125, and a second client device 130. These devices are described in more detail below in connection with FIG. 2 and FIG. 3.

Vehicle routing platform 105 may include one or more devices capable of receiving, generating, storing, processing, and/or providing information regarding a plurality of locations and/or regarding travel times between pairs of locations of the plurality of locations. For example, vehicle routing platform 105 may be configured to store the information regarding the plurality of locations and/or the travel times in first data structure 115 and/or in second data structure 120 and store the travel times in third data structure 125. Additionally, vehicle routing platform 105 may be configured to obtain the travel times from third data structure 125 based on the values at the logical indexes stored of first data structure 115 and/or the offset indexes of second data structure 120.

First data structure 115 may include a data structure (e.g., a database, a table, and/or a linked list) that stores a value at a logical index for each pair of locations of the plurality of locations, as described in more detail below. As an example, a value, at a logical index for a pair of locations, may indicate whether a travel time, between the pair of locations, has been determined and/or is to be stored in third data structure 125. For instance, the value at the logical index may be a first value, for the pair of locations, to indicate that the travel time has not been determined for the pair of locations and/or has not been stored in third data structure 125. Alternatively, the value at the logical index may be a second value, for the pair of locations, to indicate that the travel time has been determined for the pair of locations and/or has been stored in third data structure 125.

Second data structure 120 may include a data structure (e.g., a database, a table, and/or a linked list) that stores an offset index for every Nth logical index, as described in more detail below. The offset index, for an Nth logical index, may be based on a quantity of preceding logical indexes with values indicating that travel times have been determined and/or have been stored. The preceding logical indexes may precede the Nth logical index in first data structure 115. Third data structure 125 may include a data structure (e.g., a database, a table, and/or a linked list) that stores the travel times between pairs of locations, as described in more detail below.

Figure 1A:
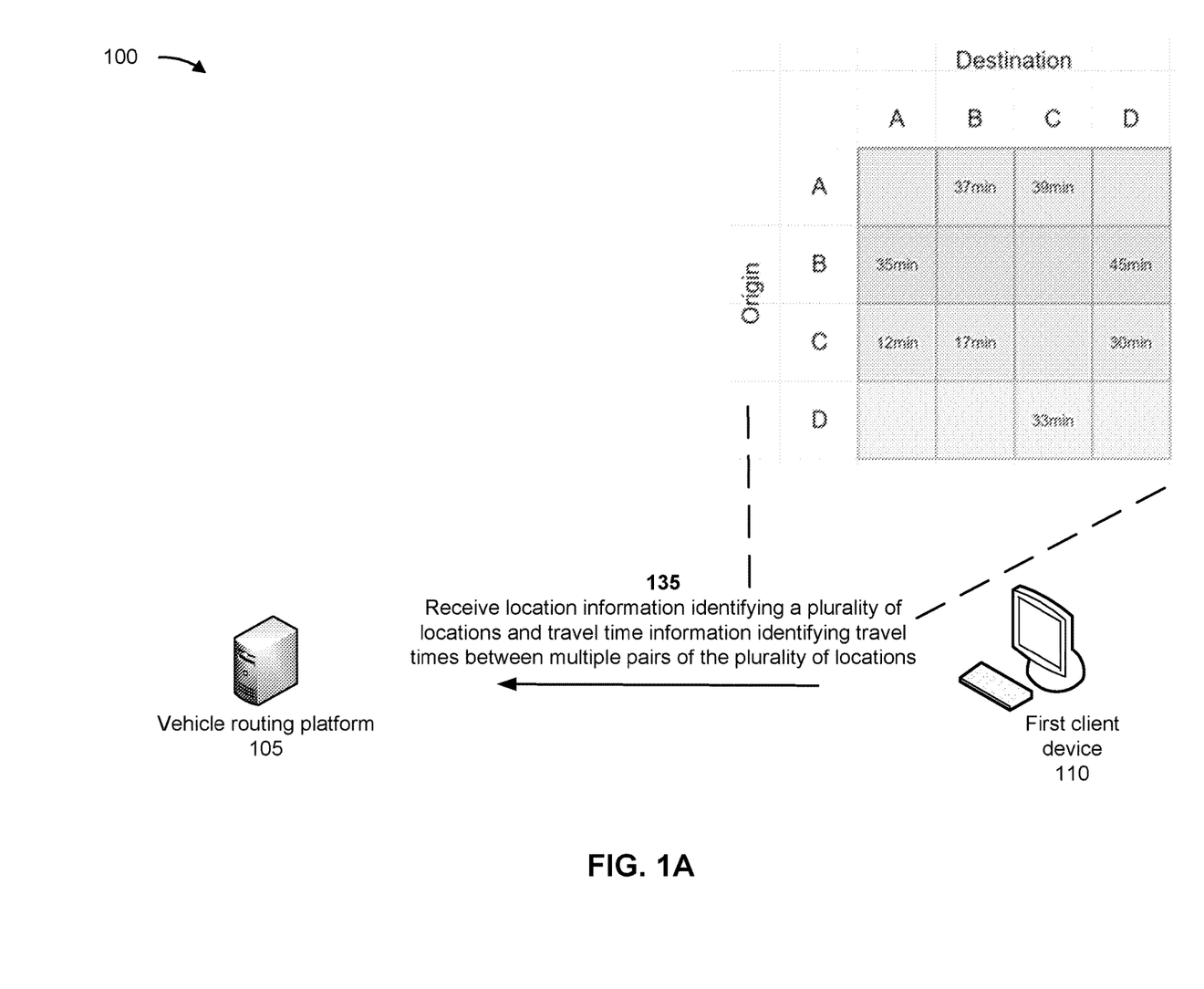
FIGS. 1A-1F are diagrams of an example associated with determining routing data using multiple data structures.

As shown in FIG. 1A, and by reference number 135, vehicle routing platform 105 may receive location information identifying a plurality of locations and travel time information identifying travel times between multiple pairs of locations of the plurality of locations. In some examples, vehicle routing platform 105 may receive the location and the travel time information from first client device 110. The location information may identify a plurality of origin locations and a plurality of destination locations.

As shown in FIG. 1A, the location information and the travel information may be provided in the format of a matrix. For example, the rows of the matrix may indicate the origin locations and the columns of the matrix may indicate the destination locations. As shown in FIG. 1, the travel time between origin location A (row 0) and destination location B (col 1) may be 37 minutes, the travel time between origin location A (row 0) and destination location C (col 2) may be 39 minutes, and so on.

As shown in FIG. 1A, in some situations, a travel time between a pair of locations in one direction may be different than a travel time between the same pair of locations in an opposite direction. For example, as shown in FIG. 1A, a travel time from origin location A to destination location B may be 37 minutes while a travel time from origin location B to destination location A may be 35 minutes.

As shown in FIG. 1A, the travel time information may include travel times for a portion of all possible pairs of locations. In some examples, the portion of all possible pairs of locations may be correspond to locations that are closest to each other out of the plurality of locations. For example, the portion of all possible pairs of locations may correspond to pairs of locations with distances that satisfy a distance threshold (e.g., less than or equal to the distance threshold). While the location information and the travel information are provided in the format of a matrix, the location information and the travel information may be provided in other formats, such as a graph, a histogram, and/or plain text, among other examples.

Figure 1B:
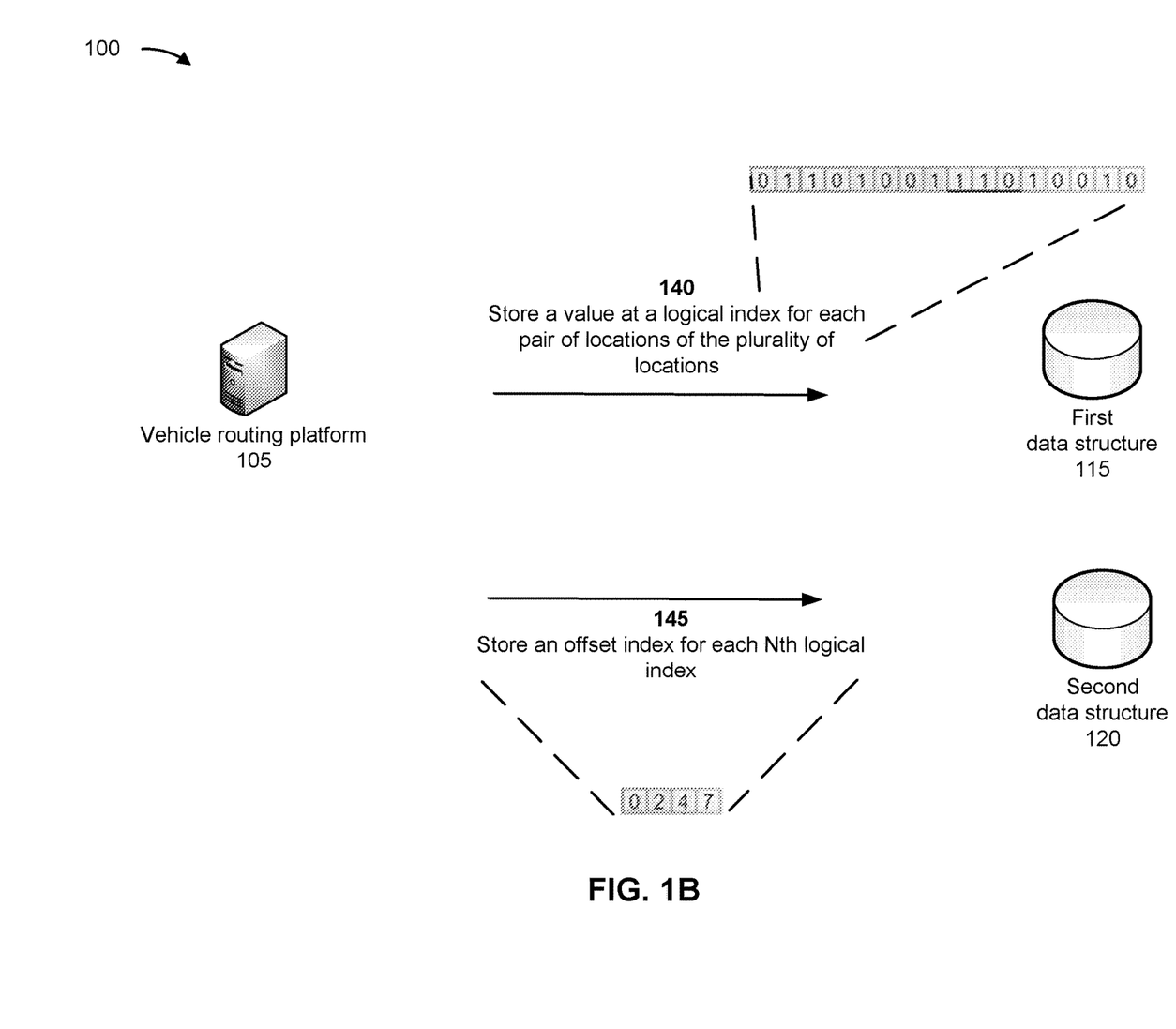

As shown in FIG. 1B, and reference number 140, vehicle routing platform 105 may store a value at a logical index for each pair of locations of the plurality of locations. For example, vehicle routing platform 105 may store values at logical indexes, for all pairs of locations identified by the location information. For instance, vehicle routing platform 105 may store the values in first data structure 115. The value, at the logical index for a pair of locations, may be based on whether a travel time has been determined for the pair of locations and/or is to be stored in third data structure 125.

For example, the value (at the logical index) may be a first value indicating that the travel time has not been determined for the pair of locations. Alternatively, the value (at the logical index) may be a second value indicating that the travel time has been determined for the pair of locations. In some implementations, the first value may be 0 and the second value may be 1. In this regard, vehicle routing platform 105 may set a bit, for a pair of locations, to indicate that a travel time has been determined for the pair of locations.

As shown in FIG. 1B, the values, at the logical indexes, may be stored in a first plurality of entries of a first array. For instance, a first entry, of the first array, may store a value at the logical index for a first entry (row 0, col 0) in the matrix for a first pair of locations (origin location A, destination location A); a second entry, of the first array, may store another value at the logical index for a second entry (row 0, col 1) in the matrix for a second pair of locations (origin location A, destination location B); and so on. In this regard, the value at the logical index for each pair of locations, of the plurality of pairs of locations, may be stored in the first plurality of entries in accordance with an order in which the plurality of pairs of locations are ordered in the matrix.

Additionally, as shown in FIG. 1B, the values at the logical indexes may be grouped by origin location. For example, values at a first set of logical indexes may correspond to pairs of locations that include a first origin location (origin location A), values at a second set of logical indexes may correspond to pairs of locations that include a second origin location (origin location B), and so on.

As shown in FIG. 1B, the value at the logical index (in the first entry of the first array) is the first value which indicates that a travel time has not been determined for the first pair of locations; the value at the logical index (in the second entry of the first array) is the second value which indicates that a travel time has been determined for the second pair of locations; and so on. While FIG. 1B indicates the use of 0 for the first value and 1 for the second value, other combination of values may be used for the logical indexes.

As shown in FIG. 1B, and by reference number 145, vehicle routing platform 105 may store an offset index for each Nth logical index. In other words, vehicle routing platform 105 may store an offset index for each predetermined logical index of one or more predetermined logical indexes of the first data structure. For example, vehicle routing platform 105 may store the offset index for each Nth logical index in second data structure 120. A value of the offset index, for an Nth logical index, may be based on a quantity of preceding logical indexes with values indicating that travel times have been determined and/or have been stored in third data structure 125. The preceding logical indexes may precede the Nth logical index in first data structure 115.

For example, the value of the offset index, for the Nth logical index, may be based on a quantity of preceding logical indexes having a second value. For instance, a first Nth logical index (logical index 0 of first data structure 115 or row 0 and column 0 of the matrix) precedes a second Nth logical index (logical index 4 of first data structure 115 or row 1 and column 0 of the matrix). Similarly, the second Nth logical index (logical index 4 of first data structure 115 or row 1 and column 0 of the matrix) precedes a third Nth logical index (logical index 8 of first data structure 115 or row 2 and column 0 of the matrix).

With respect to the value of the offset index for the first Nth logical index (logical index 0 of first data structure 115 or the first logical index of first data structure 115), the first Nth logical index is not preceded by another logical index. Accordingly, the value of the offset index for the first Nth logical index (entry number 0 in second data structure 120) is 0. For example, no bit is set, in the first plurality of entries, before the first Nth logical index (corresponding to logical index 0 of first data structure 115 or the first logical index of first data structure 115).

With respect to the value of the offset index for the second Nth logical index, the value may be based on a quantity of logical indexes preceding the second Nth logical index in first data structure 115. As shown in FIG. 1B, the first plurality of entries identify two logical indexes, with the second value, that precede the second Nth logical index in first data structure 115. Accordingly, the value of the offset index for the second Nth logical index (entry number 1 in second data structure 120) is 2. For example, 2 bits are set, in the first plurality of entries, before the second Nth logical index (corresponding to logical index 4 of first data structure 115 or the fifth logical index of first data structure 115).

With respect to the value of the offset index for the third Nth logical index, the value may be based on a quantity of logical indexes preceding the third Nth logical index. As shown in FIG. 1B, the first plurality of entries identify four logical indexes, with the second value, that precede the third Nth logical index in first data structure 115. Accordingly, the value of the offset index for the third Nth logical index (entry number 2 in second data structure 120) is 4.

As shown in FIG. 1B, the offset indexes may be stored in a second plurality of entries of a second array. For instance, a first entry, of the second array, may store the offset index for the first Nth logical index (e.g., a value of 0); a second entry, of the second array, may store the offset index for the second Nth logical index (e.g., a value of 2); a third entry, of the second array, may store the offset index for the third Nth logical index (e.g., a value of 4) and so on. In this regard, the offset index for each offset index may be stored in the second plurality of entries in accordance with an order in which the origin locations are ordered in the matrix.

A value of a particular offset index (for a particular Nth logical index) may be used to expedite a search of third data structure 125 to identify a particular travel time between a particular pair of locations. For example, the value of the particular offset index may be used to skip entries, of the third plurality of entries (of the third array), that correspond to the preceding logical indexes preceding the particular Nth logical index.

Figure 1C:
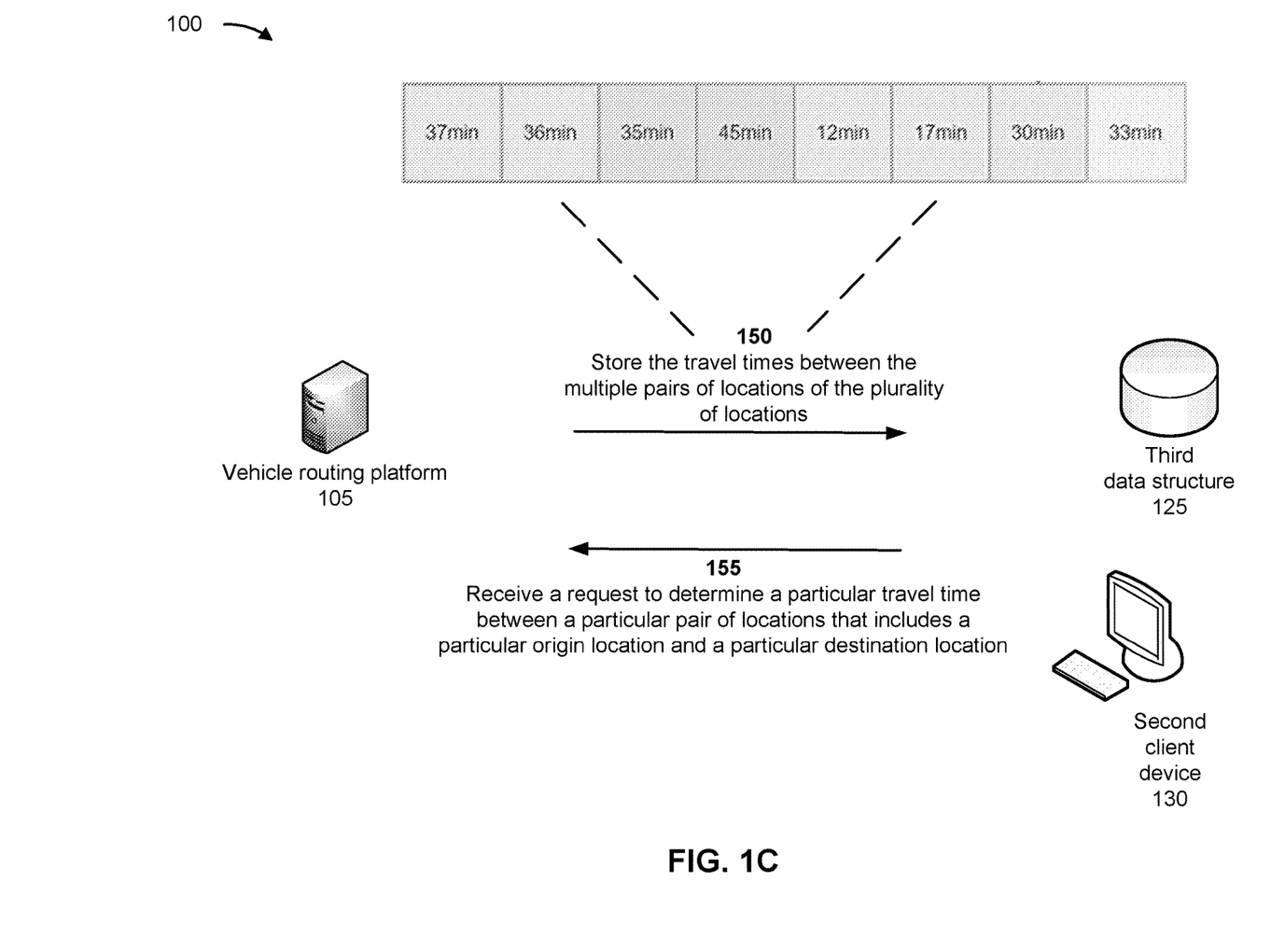

As shown in FIG. 1C, and by reference number 150, vehicle routing platform 105 may store the travel times between the multiple pairs of locations of the plurality of locations. For example, vehicle routing platform 105 may store the travel times in third data structure 125. As shown in FIG. 1C, the travel times may be stored in a third plurality of entries of a third array in accordance with an order in which the plurality of pairs of locations are ordered in the matrix, in a manner similar to a manner in which the logical indexes are stored in the first plurality of entries.

For instance, a first entry, of the third array, may store the travel time for a first pair of locations (including the first origin location) for which a travel time has been determined; a second entry, of the third array, may store the travel time for a second pair of locations (including the first origin location) for which a travel time has been determined; a third entry, of the third array, may store the travel time for a first pair of locations (including the second origin location) for which a travel time has been determined; and so on.

As shown in FIG. 1C, and by reference number 155, vehicle routing platform 105 may receive a request to determine a particular travel time between a particular pair of locations that includes a particular origin location and a particular destination location. Vehicle routing platform 105 may receive the request from second client device 130. The request may include information identifying the particular origin location and the particular destination location. Based on the information identifying the particular origin location and the particular destination location, vehicle routing platform 105 may determine a key that may be used to determine a particular logical index for the particular pair of locations. For instance, based on the information identifying the particular origin location and the particular destination location, vehicle routing platform 105 may determine a particular row of the matrix corresponding to the particular origin location and a particular column of the matrix corresponding to the particular destination location. The key may be based on the particular row and the particular column.

Figure 1D:
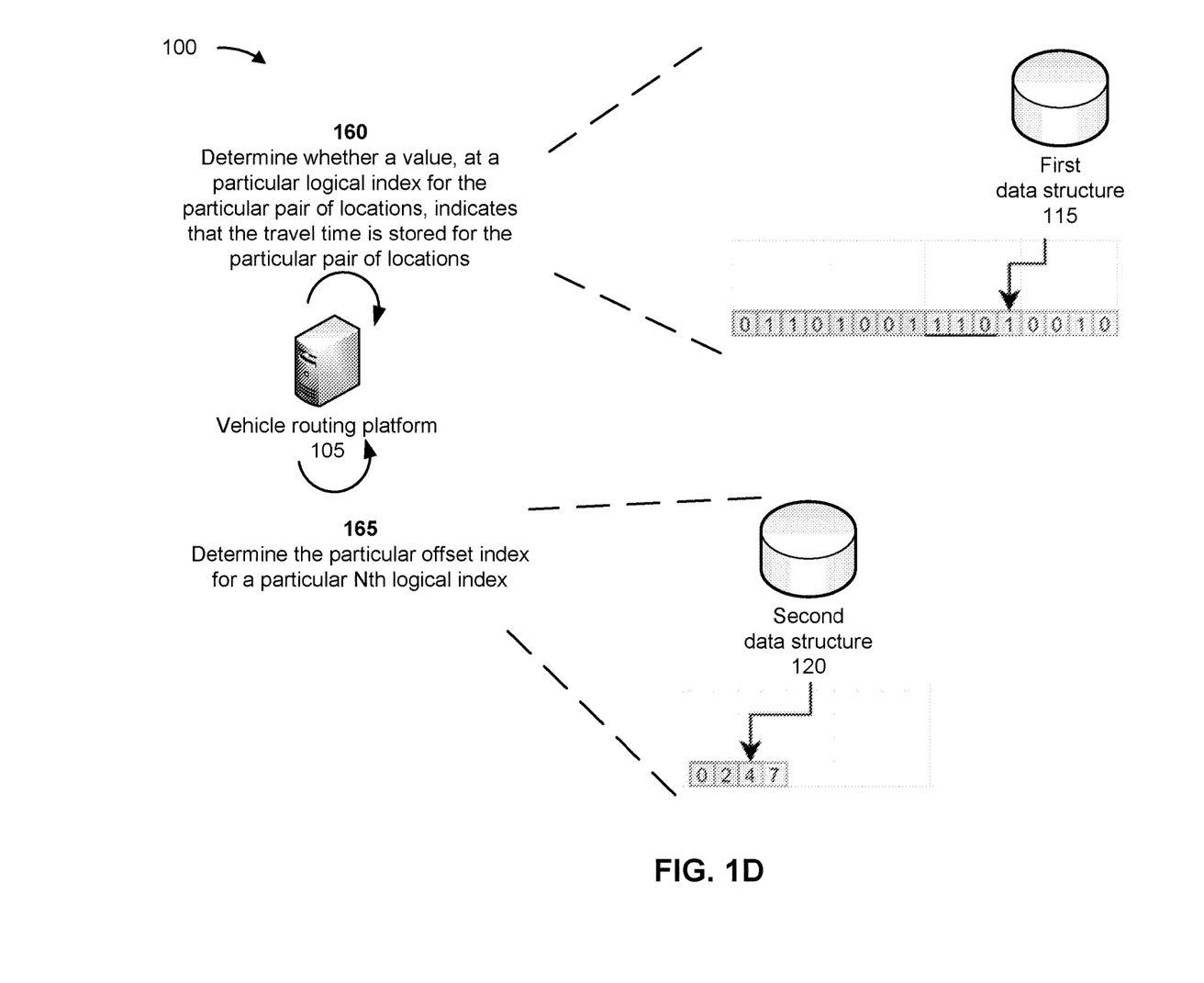

As shown in FIG. 1D, and by reference number 160, vehicle routing platform 105 may determine whether a value, at a particular logical index for the particular pair of locations, indicates that the travel time is stored for the particular pair of locations. Vehicle routing platform 105 may determine the particular logical index based on the key. In some examples, vehicle routing platform 105 may determine the particular logical index based on a mathematical combination of the particular row, the particular column, and a constant. In some situations, the constant may be a value that is based on a number of origin locations.

As an example, vehicle routing platform 105 may determine the particular logical index based on the following formula:

$$\text{logical index} = \text{row} * \text{constant} + \text{column}.$$

In this example described herein, if the particular row is row 2 (e.g., origin location C), the particular column is column 3 (e.g., destination location D), and the constant is four (e.g., the number of origin locations), then the particular logical index would be 2*4+3, which is equal to 11. Vehicle routing platform 105 may search first data structure 115 to determine a value of entry number 11 to determine whether the value indicates that the travel time is stored for the particular pair of locations.

As shown in FIG. 1D, the value of entry number 11 entry is 1. Accordingly, vehicle routing platform 105 may determine that the travel time is stored in third data structure 125 for the particular pair of locations.

As shown in FIG. 1D, as shown in reference number 165, vehicle routing platform 105 may determine the particular offset index for a particular Nth logical index. In some examples, vehicle routing platform 105 may determine the particular offset index based on a mathematical combination of the particular logical index and the constant.

As an example, vehicle routing platform 105 may determine an entry (in second data structure 120) for the particular offset index based on the following formula:

$$\text{offset index entry} = \text{logical index}/\text{constant}.$$

In this example described herein, if the particular logical index is 11 and the constant is 4, then the entry for the particular offset index would be an integer value of 11/4, which would be 2. Vehicle routing platform 105 may search second data structure 120 to determine a value of entry number 2. As shown in FIG. 1D, the value of entry number 2 is 4. The value of the entry (for the particular offset index) may be used to expedite a search of third data structure 125 to identify the particular travel time. For example, the value of the particular offset index may be used to skip entries of the third plurality of entries (of the third array) that correspond to logical indexes that precede the particular logical index. In the present example, the value of 4 may indicate that the first 4 entries of the third array of third data structure 125 may be skipped (because they precede the particular logical index).

Figure 1E:
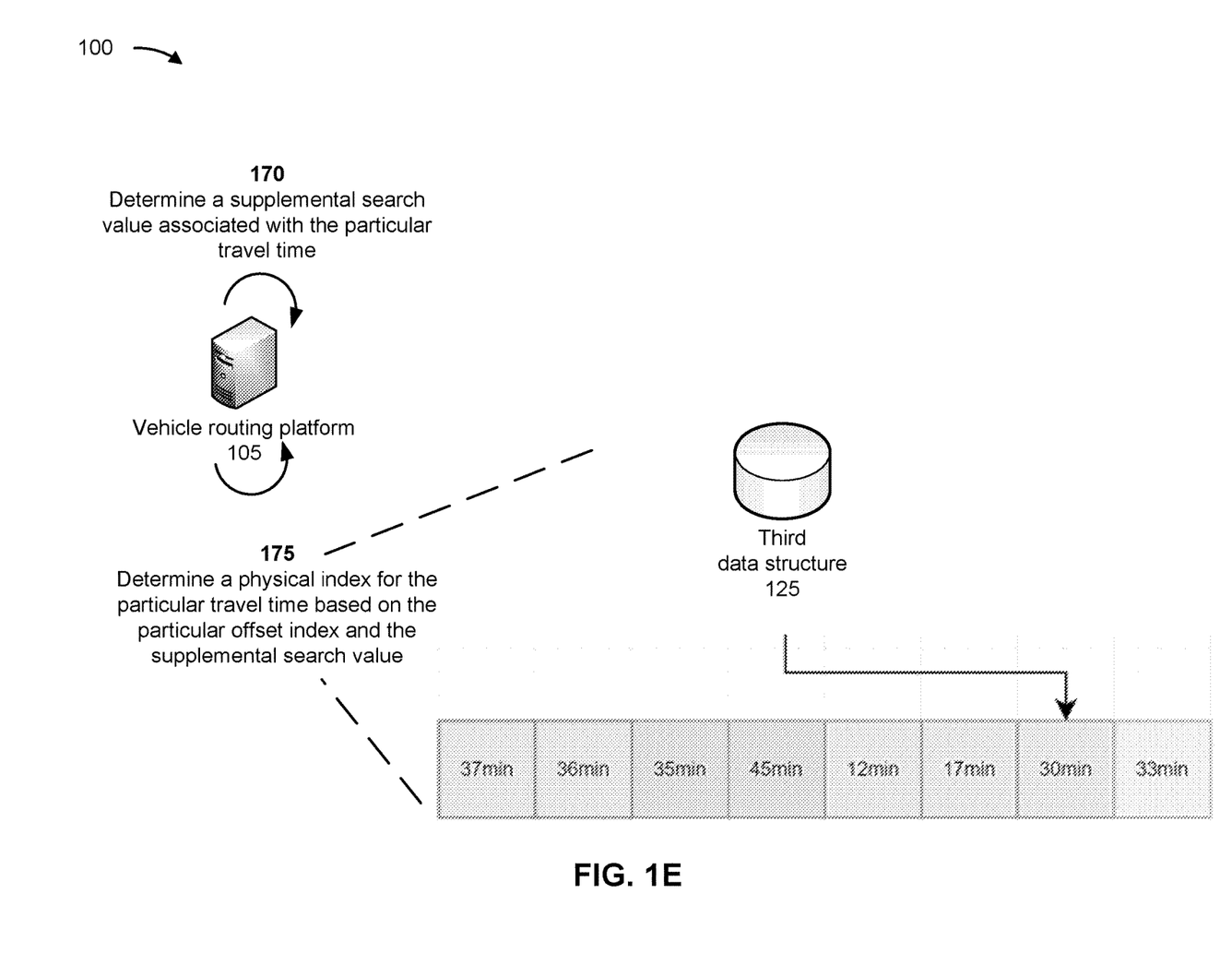

As shown in FIG. 1E, and by reference number 170, vehicle routing platform 105 may determine a supplemental search value associated with the particular travel time. In some implementations, vehicle routing platform 105 may determine the supplemental search value based on the Nth logical index preceding the particular logical index for the particular pair of locations.

For example, vehicle routing platform 105 may identify the Nth logical index preceding the particular logical index. The logical index may be the logical corresponding the offset value read from second data structure 120. For example, if N is 128 and we are searching for the logical index 132, the offset value read from second data structure 120 would be at position 132/128=1. In this regard, the first entry would be 128, the preceding entry would be 131 (the entry preceding the logical index 132), and the supplemental search value would be the quantity of travel times stored for logical indexes 128 to 131.

In the example described herein, vehicle routing platform 105 may determine the Nth logical index preceding the particular logical index 11. If N is 4, the Nth logical index would be 8 (the first entry). The preceding entry may be entry number 10 (which immediately precedes entry number 11). Vehicle routing platform 105 may determine that 2 bits are set from entry number 8 to entry number 10. Accordingly, vehicle routing platform 105 may determine that the supplemental search value is 2.

The supplemental search value may be determined to further expedite a search of third data structure 125 to identify the particular travel time. For example, the supplemental search value may be used to skip additional entries of the third plurality of entries. The additional entries may be entries (associated with the particular origin location) that do not correspond to the particular destination location.

As shown in FIG. 1E, and by reference number 175, vehicle routing platform 105 may determine a physical index for the particular travel time based on the particular offset index and the supplemental search value. For example, vehicle routing platform 105 may determine the physical index for the particular travel time based on a mathematical combination of a value of the particular offset index and the supplemental search value.

As an example, vehicle routing platform 105 may add the value of the particular offset index and the supplemental search value. In the present example, the physical index may be 4+2, which is equal to 6. Accordingly, vehicle routing platform 105 may determine that the particular travel time is stored in entry number 6 of the third plurality of entries. Therefore, vehicle routing platform 105 may determine that the particular travel time is 30 minutes.

Figure 1F:
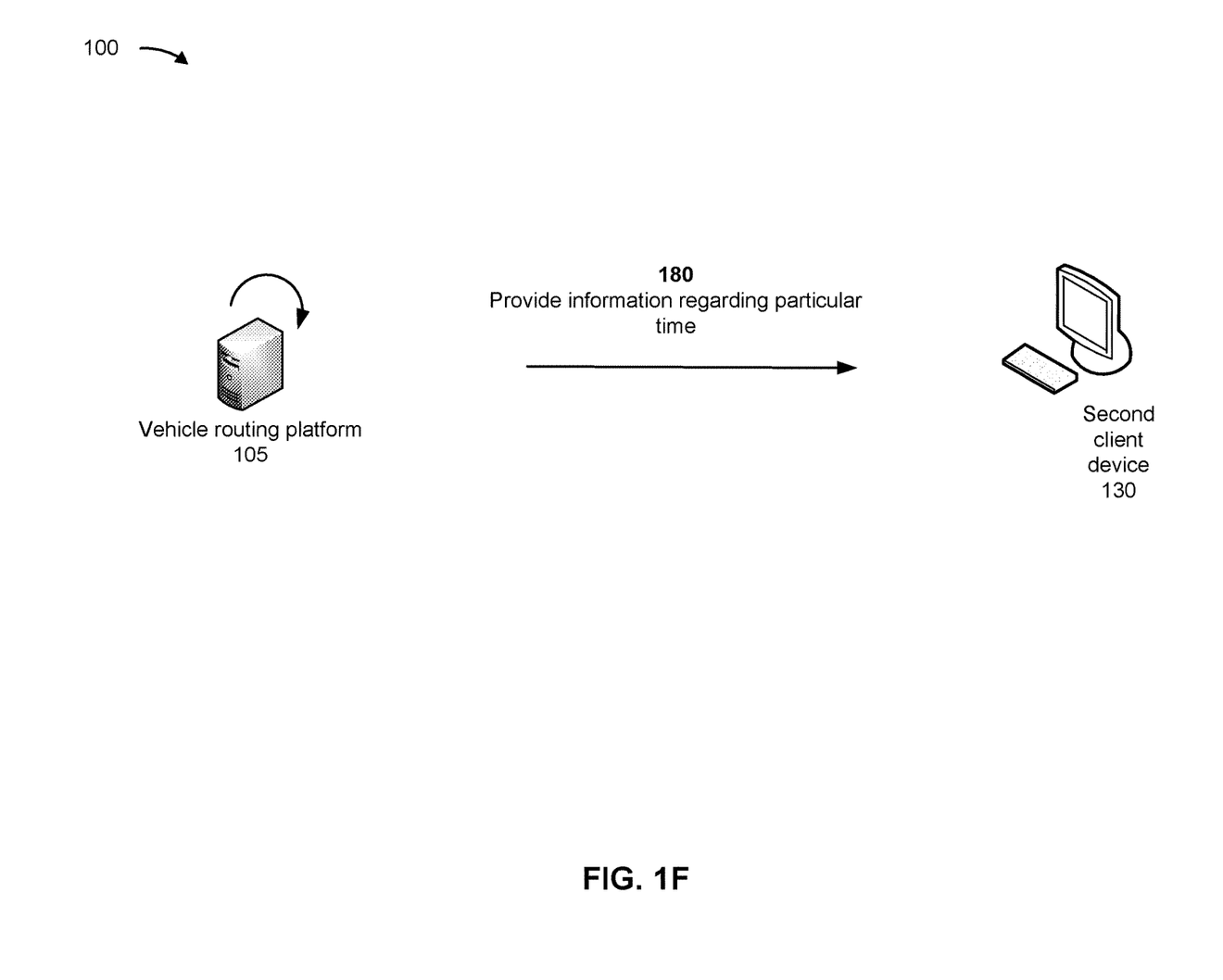

As shown in FIG. 1F, and by reference number 180, vehicle routing platform 105 may provide information regarding the particular travel time. For example, vehicle routing platform 105 may provide the information regarding the particular travel time to second client device 130.

Using the combination of data structures as described herein may support fast random access while minimizing an amount of memory allocation for storing the information regarding the plurality of locations and/or regarding the travel times. For example, using the combination of data structures as described herein may support sparse data as well as support dense data (e.g., support storing data of a matrix with dense data).

As explained above, an entry of first data structure 115 may the first value or the second value. By storing element lengths with an alternate encoding in this manner, the combination of data structures may support arbitrary integer element sizes. In some instances, a shortest path between two locations may depend on a type of vehicle used to travel a path. Using the combination of data structures as described herein may store all the required path information for a pair of locations in one cell, allocating only the space required by unique paths between the locations of the pair of locations, as each value may be of independent size.

The variable length encoding, of the combination of data structures, may store large range driving time values and high precision driving time values. Accordingly, the combination of data structures described herein may reduce the space allocated for short paths while still allowing high precision representation of long paths.

In some examples, the value of the constant (described above) may be selected such that the number of bits needed to read from the first array matches the cache line size of a target hardware. Only two cache lines are to be loaded, one from the second array and one from the first array. Aa an addresses of each array may be calculated for these arrays from a key (e.g., a row and a column), the first array and the second array may be loaded concurrently in memory. Based on the first array and the second array, an address of a value (e.g., of a travel distance) may be calculated. Additionally, one further cache line (to access the value) may be requested.

The combination of data structures described herein may have an access time (random access memory) that is comparable to an access time of a hash table. Compared to a hash table, the combination of data structures may have a constant access time. Unlike a hash table, the combination of data structures may maintain cache locality. For example, the combination of data structures may store different data, likely to be accessed around the same time, adjacent to each other in a memory. Additionally, unlike the sparse array, the combination of data structures remains efficient with respect to storing a wide range of data densities.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
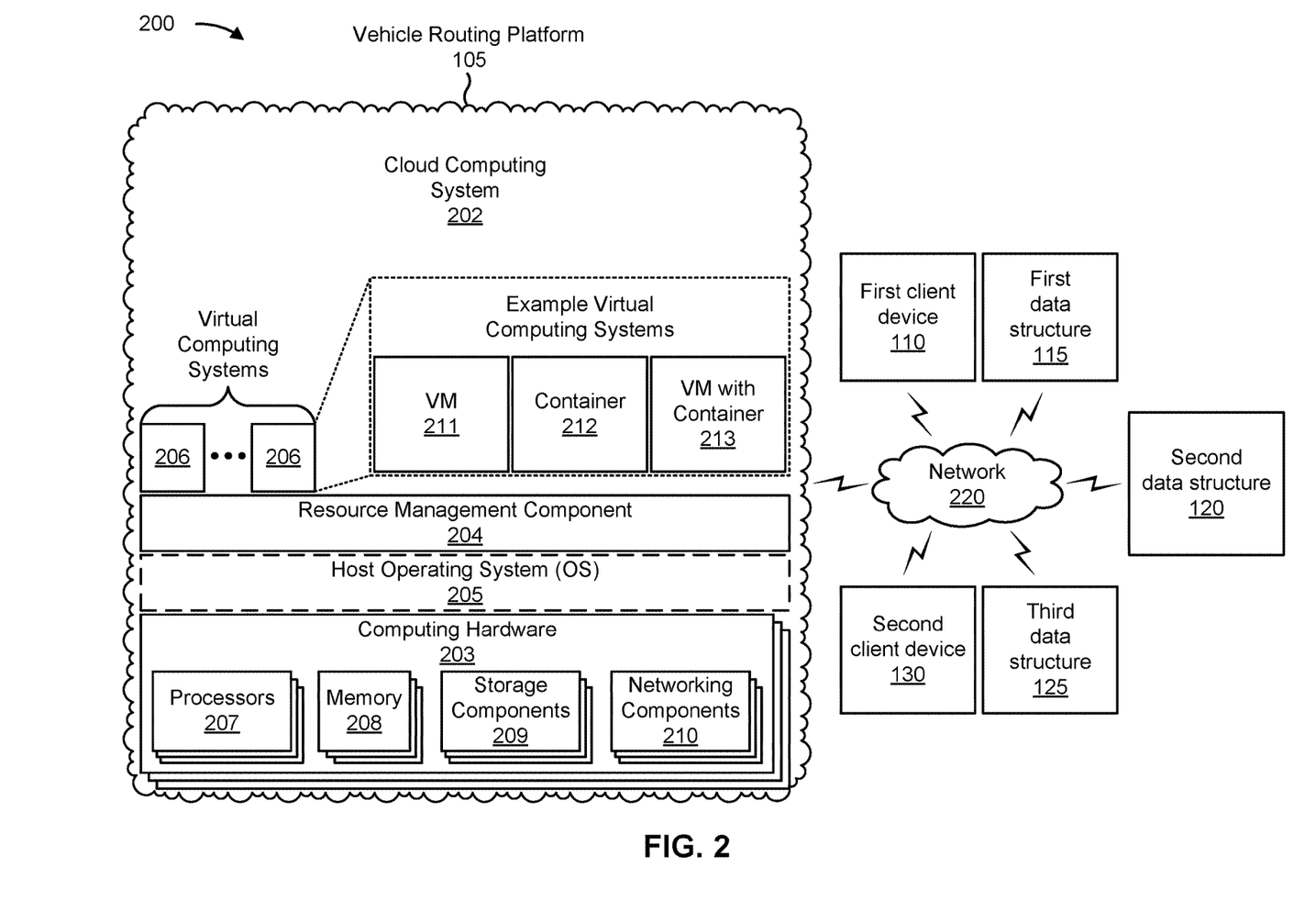
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a vehicle routing platform 105, which may include one or more elements of and/or may execute within a cloud computing system 202. The cloud computing system 202 may include one or more elements 203-213, as described in more detail below. As further shown in FIG. 2, environment 200 may include first client device 110, first data structure 115, second data structure 120, third data structure 125, second client device 130, and/or a network 220. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, or a hybrid environment 213 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the vehicle routing platform 105 may include one or more elements 203-213 of the cloud computing system 202, may execute within the cloud computing system 202, and/or may be hosted within the cloud computing system 202, in some implementations, the vehicle routing platform 105 may not be cloud-based (e.g., may be implemented outside of a cloud computing system) or may be partially cloud-based. For example, the vehicle routing platform 105 may include one or more devices that are not part of the cloud computing system 202, such as device 300 of FIG. 3, which may include a standalone server or another type of computing device. The vehicle routing platform 105 may perform one or more operations and/or processes described in more detail elsewhere herein.

First client device 110 includes one or more devices capable of receiving, generating, storing, processing, and/or providing information associated with determining routing data, as described elsewhere herein. First client device 110 may include a communication device and computing device. For example, first client device 110 may include a wireless communication device, a mobile phone, a user equipment, a laptop computer, a tablet computer, a desktop computer, or a similar type of device. Second client device 130 may be similar to first client device 110.

Network 220 includes one or more wired and/or wireless networks. For example, network 220 may include a cellular network, a public land mobile network (PLMN), a local area network (LAN), a wide area network (WAN), a private network, the Internet, and/or a combination of these or other types of networks. The network 220 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
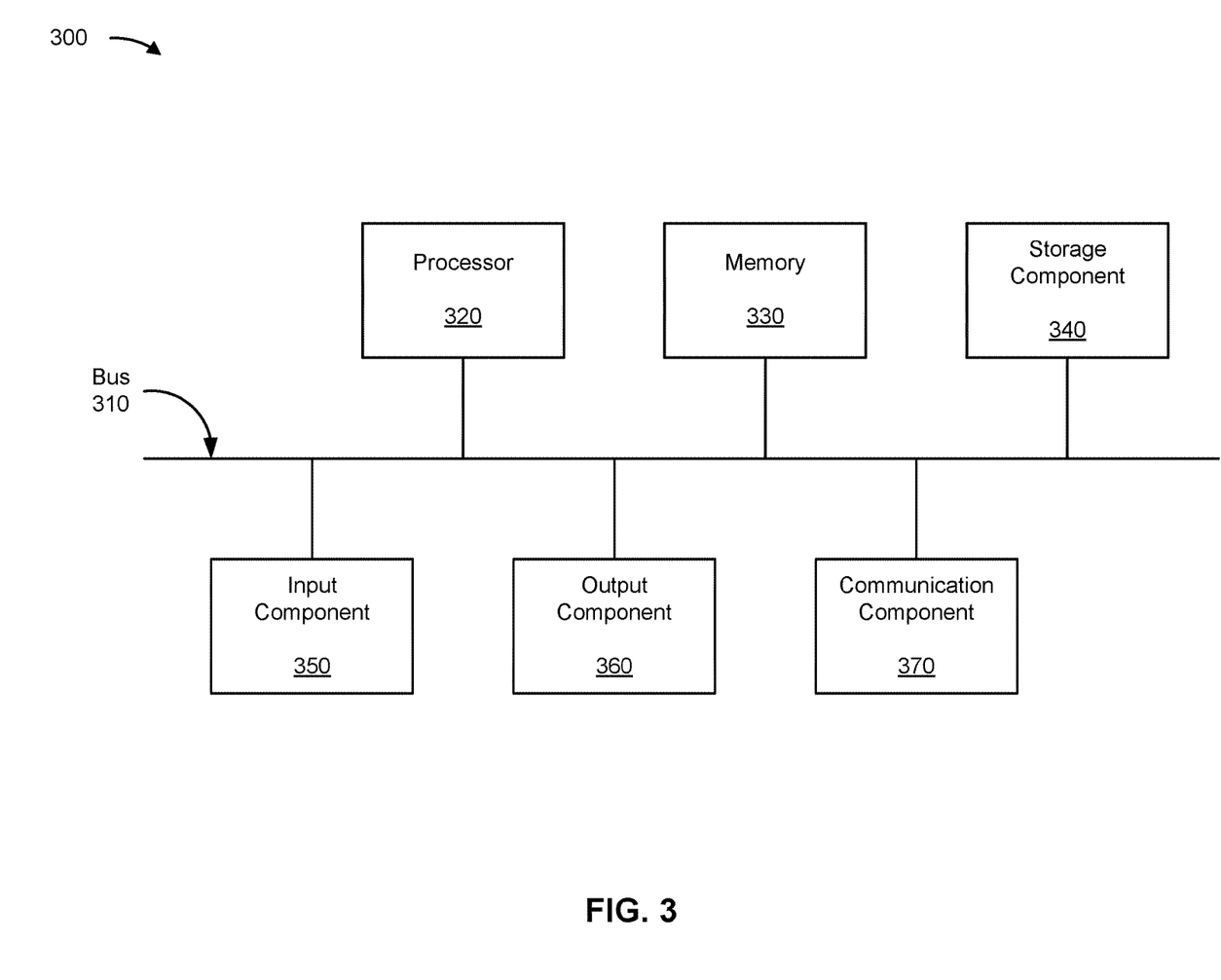
FIG. 3 is a diagram of example components of one or more devices of FIG. 2.

FIG. 3 is a diagram of example components of a device 300, which may correspond to vehicle routing platform 105, first client device 110, and/or second client device 130. In some implementations, vehicle routing platform 105, first client device 110, and/or second client device 130 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
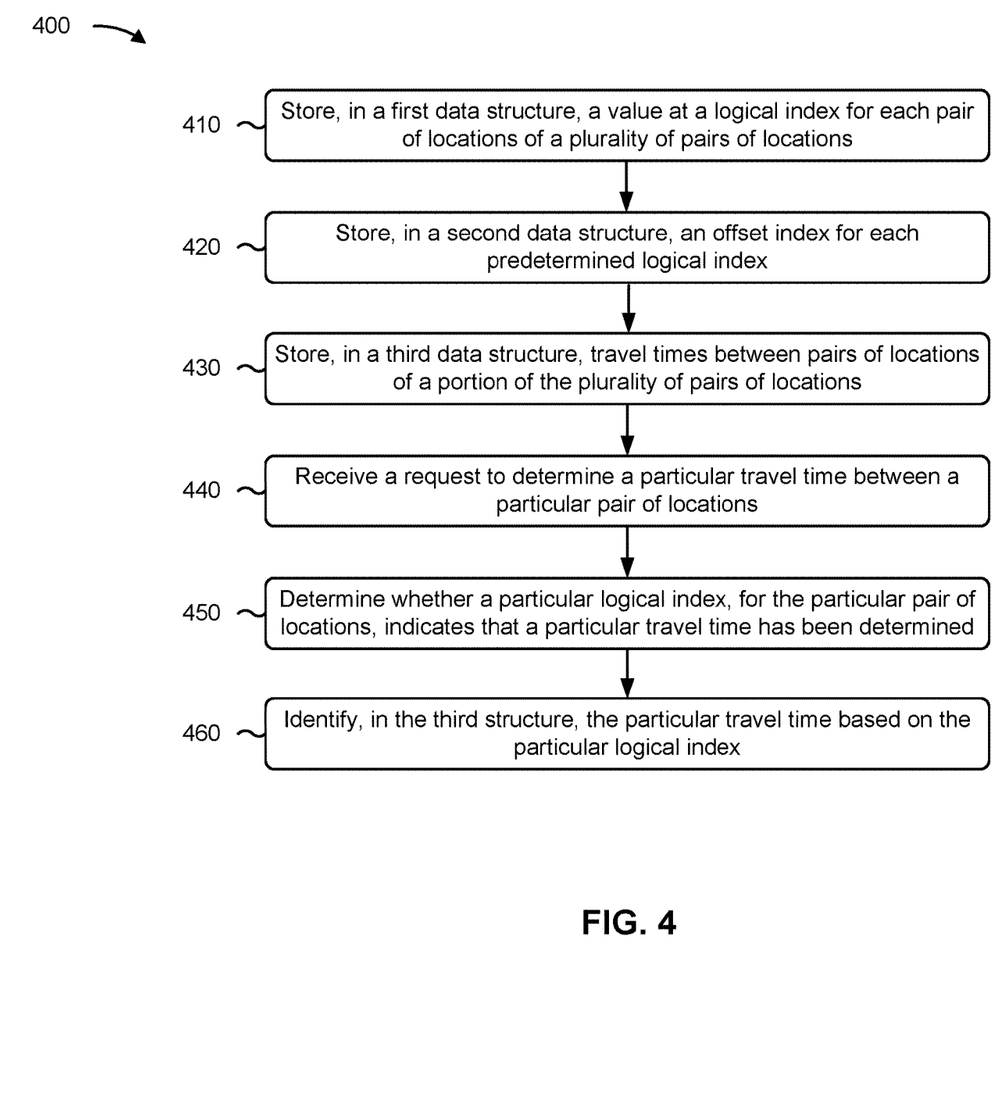
FIG. 4 is a flowchart of an example process relating to determining routing data using multiple data structures.

FIG. 4 is a flowchart of an example process 400 relating determining route data. In some implementations, one or more process blocks of FIG. 4 may be performed by a vehicle routing platform (e.g., vehicle routing platform 105). In some implementations, one or more process blocks of FIG. 4 may be performed by another device or a group of devices separate from or including the vehicle routing platform, such as a first client device (e.g., first client device 110) and/or a second client device (e.g., second client device 130). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include storing, in a first data structure, a value at a logical index for each pair of locations of a plurality of pairs of locations (block 410). For example, the vehicle routing platform may store, in a first data structure, a value at a logical index for each pair of locations of a plurality of pairs of locations, wherein the value, of the logical index for a pair of locations, indicates whether a travel time, between the pair of locations, has been determined, as described above. In some implementations, the value, of the logical index for a pair of locations, indicates whether a travel time, between the pair of locations, has been determined.

As further shown in FIG. 4, process 400 may include storing, in a second data structure, an offset index for each predetermined logical index of one or more predetermined logical indexes of the first data structure (block 420). For example, the vehicle routing platform may store, in a second data structure, an offset index for each predetermined logical index of one or more predetermined logical indexes of the first data structure; wherein the offset index, for a predetermined logical index, is based on a quantity of logical indexes preceding the predetermined logical index in the first data structure, and wherein values at the logical indexes indicate that travel times have been determined, as described above. In some implementations, the offset index, for a predetermined logical index, is based on a quantity of logical indexes preceding the predetermined logical index in the first data structure, and wherein values at the logical indexes indicate that travel times have been determined.

As further shown in FIG. 4, process 400 may include storing, in a third data structure, travel times between pairs of locations of a portion of the plurality of pairs of locations (block 430). For example, the vehicle routing platform may store, in a third data structure, travel times between pairs of locations of a portion of the plurality of pairs of locations, as described above.

As further shown in FIG. 4, process 400 may include receiving a request to determine a particular travel time between a particular pair of locations (block 440). For example, the vehicle routing platform may receive a request to determine a particular travel time between a particular pair of locations, as described above.

As further shown in FIG. 4, process 400 may include determining whether a particular value, at a particular logical index for the particular pair of locations, indicates that a particular travel time has been determined (block 450). For example, the vehicle routing platform may determine whether a particular value, at a particular logical index for the particular pair of locations, indicates that a particular travel time has been determined, as described above.

As further shown in FIG. 4, process 400 may include identifying, in the third structure, the particular travel time based on the particular value indicating that the particular travel time has been determined (block 460). For example, the vehicle routing platform may identify, in the third structure, the particular travel time based on the particular value indicating that the particular travel time has been determined, as described above.

In some implementations, storing the value of the logical index comprises storing a first value, for the pair of locations, to indicate that the travel time has not been determined for the pair of locations, or storing a second value, for the pair of locations, to indicate that the travel time has been determined for the pair of locations.

In some implementations, process 400 includes determining that the particular value is the second value, and determining that the particular travel time has been determined based on the particular value being the second value.

In some implementations, process 400 includes determining a particular offset index associated with the particular logical index, and determining the particular travel time further based on the particular offset index.

In some implementations, determining the particular offset index comprises determining the particular offset index based on the particular logical index for the particular pair of locations.

In some implementations, process 400 includes determining a physical index associated with the particular pair of locations, and determining the particular travel time based on the particular offset index and the physical index.

In some implementations, determining the physical index comprises determining the physical index based on the particular offset index and a quantity of travel times determined for a set of logical indexes preceding the particular index.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method performed by a vehicle routing platform, the method comprising:
   storing, in a first data structure, a value at a logical index for each pair of locations of a plurality of pairs of locations,
      wherein the value, of the logical index for a pair of locations, indicates whether a travel time, between the pair of locations, has been determined;
   storing, in a second data structure, an offset index for each predetermined logical index of one or more predetermined logical indexes of the first data structure;
      wherein the offset index, for a predetermined logical index, is based on a quantity of logical indexes preceding the predetermined logical index in the first data structure, and wherein values at the logical indexes indicate that travel times have been determined;
   storing, in a third data structure, travel times between pairs of locations of a portion of the plurality of pairs of locations;
   receiving a request to determine a particular travel time between a particular pair of locations;
   determining whether a particular value, at a particular logical index for the particular pair of locations, indicates that a particular travel time has been determined; and
   identifying, in the third structure, the particular travel time based on the particular value indicating that the particular travel time has been determined.

2. The method of claim 1, wherein storing the value of the logical index comprises:
   storing a first value, for the pair of locations, to indicate that the travel time has not been determined for the pair of locations; or
   storing a second value, for the pair of locations, to indicate that the travel time has been determined for the pair of locations.

3. The method of claim 2, further comprising:
   determining that the particular value is the second value; and
   determining that the particular travel time has been determined based on the particular value being the second value.

4. The method of claim 1, further comprising:
   determining a particular offset index associated with the particular logical index; and
   determining the particular travel time further based on the particular offset index.

5. The method of claim 4, wherein determining the particular offset index comprises:
   determining the particular offset index based on the particular logical index for the particular pair of locations.

6. The method of claim 4, further comprising:
   determining a physical index associated with the particular pair of locations; and
   determining the particular travel time based on the particular offset index and the physical index.

7. The method of claim 6, wherein determining the physical index comprises:
   determining the physical index based on the particular offset index and a quantity of travel times determined for a set of logical indexes preceding the particular logical index.

8. A device, comprising:
   one or more processors configured to:
      store, in a first data structure, a value at a logical index for each pair of locations of a plurality of pairs of locations,
         wherein the value, at the logical index for a pair of locations, indicates whether a travel time, between the pair of locations, has been determined;
      store, in a second data structure, an offset index for each predetermined logical index of one or more predetermined logical indexes of the first data structure,
         wherein the offset index, for a predetermined logical index, is based on a quantity of logical indexes preceding the predetermined logical index in the first data structure, and wherein values at the logical indexes indicate that travel times have been determined;
      store, in a third data structure, travel times between pairs of locations of a portion of the plurality of pairs of locations; and
      obtain a particular travel time, between a particular pair of locations, based on a particular value at a particular logical index for the particular pair of locations,
         wherein the particular travel time is stored in the third data structure and the particular value is stored in the first data structure.

9. The device of claim 8, wherein the one or more processors are further configured to:
   determine the particular logical index based on origin location information identifying a particular origin location of the particular pair of locations, destination location information identifying a particular destination location of the particular pair of locations, and a constant that is based on a number of origin locations.

10. The device of claim 8, wherein the particular travel time is obtained further based on a particular offset index associated with the particular logical index, and
    wherein the one or more processors are further configured to:
       determine the particular offset index based on the particular logical index and a quantity of logical indexes associated with a particular origin location of the particular pair of locations.

11. The device of claim 8, wherein the plurality of pairs of locations are ordered in a particular order,
    wherein the first data structure is a first array that includes a first plurality of entries, and
    wherein the one or more processors, to store the value at the logical index for each pair of locations, are configured to:
       store the value at the logical index for each pair of locations, of the plurality of pairs of locations, in the first plurality of entries in accordance with the particular order.

12. The device of claim 11, wherein the third data structure is a second array that includes a second plurality of entries, and
    wherein the one or more processors, to store the travel times in the third data structure, are configured to:
       store the travel times, between the pairs of locations of the portion of the plurality of pairs of locations, in the second plurality of entries in accordance with the particular order.

13. The device of claim 8, wherein the one or more processors, to store the value at the logical index for the pair of locations, are configured to:
- store a first value, for the pair of locations, to indicate that the travel time has not been determined for the pair of locations; or
- store a second value, for the pair of locations, to indicate that the travel time has been determined for the pair of locations.

14. The device of claim 13, wherein the one or more processors, to obtain the particular travel time, are configured to:
- determine that the particular value is the second value; and
- obtain the particular travel time based on determining that the particular value is the second value.

15. A non-transitory computer-readable medium storing a set of instructions, the set of instructions comprising:
- one or more instructions that, when executed by one or more processors of a device, cause the device to:
  - store, in a first data structure, a value at a logical index for each pair of locations of a plurality of pairs of locations,
    - wherein the value, at the logical index for a pair of locations, indicates whether a travel time, between the pair of locations, has been determined;
  - store, in a second data structure, an offset index for each predetermined logical index of one or more predetermined logical indexes of the first data structure,
    - wherein the offset index, for a predetermined logical index, is based on a quantity of logical indexes preceding the predetermined logical index in the first data structure, and wherein values at the logical indexes indicate that travel times have been determined; and
  - store, in a third data structure, travel times between pairs of locations of a portion of the plurality of pairs of locations.

16. The non-transitory computer-readable medium of claim 15, wherein the plurality of pairs of locations are ordered in a particular order,
- wherein the first data structure is a first array that includes a first plurality of entries, and
- wherein the one or more instructions, that cause the device to store the value at the logical index for each pair of locations, cause the device to:
  - store the value, at the logical index for each pair of locations of the plurality of pairs of locations, in the first plurality of entries in accordance with the particular order.

17. The non-transitory computer-readable medium of claim 16, wherein the third data structure is a second array that includes a second plurality of entries, and
- wherein the one or more instructions, that cause the device to store the travel times in the third data structure, cause the device to:
  - store the travel times, between pairs of locations of the portion of the plurality of pairs of locations, in the second plurality of entries in accordance with the particular order.

18. The non-transitory computer-readable medium of claim 15, wherein the one or more instructions, that cause the device to store the value at the logical index for the pair of locations, cause the device to:
- store a first value, for the pair of locations, to indicate that the travel time has not been determined for the pair of locations; or
- store a second value, for the pair of locations, to indicate that the travel time has been determined for the pair of locations.

19. The non-transitory computer-readable medium of claim 18, wherein the one or more instructions further cause the device to:
- determine that a particular value, at a particular logical index for a particular pair of locations stored in the first data structure, is the second value; and
- obtain a particular travel time, between the particular pair of locations, stored in the third data structure based on determining that the particular value is the second value.

20. The non-transitory computer-readable medium of claim 19, wherein the one or more instructions, when executed by the one or more processors, further cause the device to:
- determine the particular logical index based on a particular origin location of the particular pair of locations, a particular destination location of the particular pair of locations, and a constant.

* * * * *